June 14, 1960
J. J. SKELLY
2,940,151
CLAMP
Filed April 19, 1956
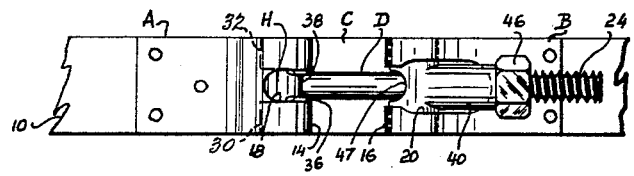
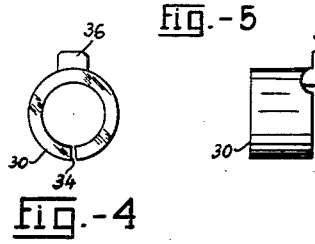
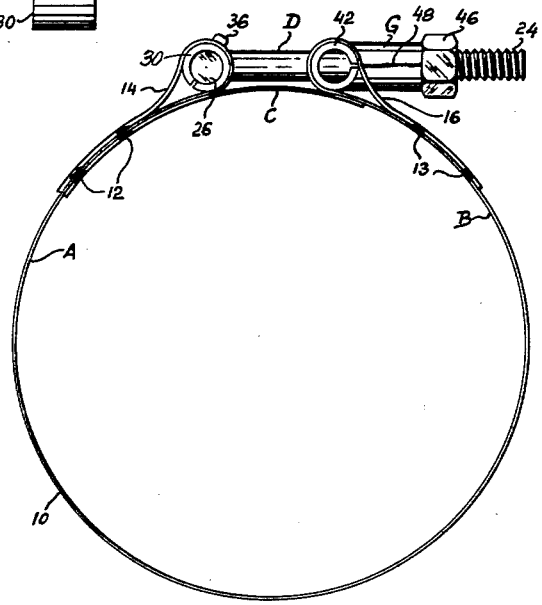
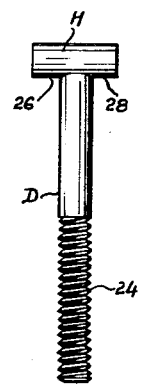
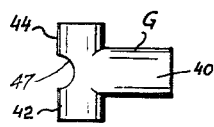
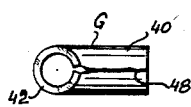
INVENTOR.
JAMES J. SKELLY
BY
Bates, Teare & McBean
ATTORNEYS

United States Patent Office 2,940,151
Patented June 14, 1960

2,940,151
CLAMP

James J. Skelly, Lyndhurst, Ohio, assignor to Specialty Products Corporation, Cleveland, Ohio, a corporation of Ohio Filed Apr. 19, 1956, Ser. No. 579,248

2 Claims. (Cl. 24—279)

This invention relates to clamps and more particularly to those which take the form of flexible bands or straps for embracing an object.

Usually, band clamps are provided with fastening devices for latching the jaws together to maintain a clamped relationship until manually or otherwise released. The clamp and latch arrangement varies, depending upon the type of object embraced, as well as the purpose for which it is intended, and the type of material with which it is associated. In most instances, it is desirable that the clamps be flexible and that the latch be simple in construction for quick manual manipulation.

One type of band clamp heretofore used includes a draw-bolt having trunnions at one end which are pivoted to one of the clamp jaws. The bolt coacts with a guide lock and an adjustable abutment type interlock at the other clamp jaw to removably fasten the clamp jaws together in any selected position. The latch is capable of being quickly released by removing the interlock and pivoting the draw-bolt out of the guide lock. The draw-bolt trunnions are pivoted in a support which takes the form of a loop at one end of the band. An added bearing surface is provided for the trunnions by mounting a sleeve bearing or collar on each of the trunnions. However, the bearings present an assembly problem in that after they are positioned on the draw-bolt trunnions, special tools or equipment are needed to form an indentation therein to match up with corresponding indentations on the cross head, the purpose of the indentations being to keep the bearings in place after the clamp has been assembled.

In another form of clamp, the draw-bolt guide is formed from a single piece of metal which is shaped to provide the shank or sleeve portion of the guide and the crosshead or trunnions at one end of the shank. The guide shank has an axial slot therethrough which is held closed by a cap forced over the end of the guide portion, the cap being held in place by retaining friction. On clamps of large diameter, it becomes necessary to lengthen the bolts and extend the shank portion of the bolt guide to position it a sufficient distance from the adjacent band loop to allow room for the adjustable abutment and the cap, and also to allow for wrench space to tighten the adjustable abutment. When this is done the shank of the bolt guide becomes progressively weaker as its length is increased. Long shanks have been known to spread apart at the slot causing failure when such clamps are highly stressed.

It is an object of the present invention to provide a clamp of the aforementioned type having draw-bolt crosshead bearings which may be quickly and simply assembled onto the crosshead without the use of special tools or equipment, and which will remain permanently in place after the clamp is completely assembled.

Another object of the invention is to provide a clamp including a draw-bolt guide having a shank of considerably increased strength and which retains such strength regardless of its length.

A further object of the invention is to provide a clamp of substantially reduced weight and which contains draw-bolt trunnion bearings which can be manufactured automatically at high speeds, said bearings having retaining means thereon to retain them in position after the clamp is assembled.

Briefly, the foregoing objects are accomplished by the provision of a clamp which in its preferred form embodies a flexible band in the form of an open loop for embracing an object and which includes a latch in the form of a T-shaped draw-bolt having trunnions at one of its ends which are pivoted to one free end of the band. A cooperating draw-bolt guide is pivoted at the other free end of the band and is adapted to receive the draw-bolt therethrough when the band embraces an object and the free ends of the clamp are adjacent each other. A suitable interlock is provided on the free end of the draw-bolt in the form of an abutment which can be adjustably positioned along the shank for coaction with the draw-bolt guide to restrain relative movement therebetween in all but one direction. The draw-bolt trunnions carry split sleeve bearings to provide an increased bearing surface for rotation within the band end loop within which they are contained. The bearings are longitudinally slotted and contain outwardly extending projections or ears which retain the bearings permanently in place after the clamp is assembled, there being no indentation required on the draw-bolt trunnions or the bearings. This construction enables assembly of the clamp without the use of tools or special equipment of any kind, and enables the bearing to be produced automatically at high speeds. In addition the reduction in weight is substantial. By allowing enough gap at the split portion of the bearing, it may be made slightly oversize for easy installation on the draw-bolt. When the clamp is tightened, the bearings will contract thereby aligning themselves perfectly with the draw-bolt cross-head. The draw-bolt guide may be fabricated from a single piece of metal and the split portion of its shank may be welded. With this construction of the guide, there is no loss of strength when the guide shank length is increased.

Other objects and advantages of the invention will become apparent from the following description taken in conjunction with the drawings in which:

Fig. 1 is a fragmentary top plan view of the free ends of the band clamp illustrating the latch device in latched position.

Fig. 2 is a front elevational view of the band clamp showing the latch device in locked position.

Fig. 3 is a top plan view of the T-shaped draw-bolt.

Fig. 4 is an enlarged front view of one of the sleeve bearings.

Fig. 5 is a side view of the bearing shown in Fig. 4.

Fig. 6 is a top plan view of the draw-bolt guide.

Fig. 7 is a side elevational view of the draw-bolt guide shown in Fig. 6.

Fig. 8 is a front end view of the draw-bolt guide shown in Fig. 6.

Referring to the drawings, there is shown a substantially C-shaped band clamp 10 having the free ends A and B, wherein the end A is provided with an extended tongue portion C, which is adapted to underlie the free end B to complete the band embracing loop. The flexible band 10 is preferably made of spring steel and is adapted to encircle or embrace an object such as a conduit. In the form shown, each free end of the band is turned back and secured upon itself, as for example by the spot welds 12 and 13 to form the end loops 14 and 16. The tongue portion C is in the form of a separate band strip, which may be secured to the underside of the loop end A by the welds 12. The top portion of each of the end loops 14 and 16 is slotted longitudinally as at 18 and 20 along the band (Fig. 1) so that when the band is looped about an object and the ends are positioned adjacent each other, the slots will be in alignment with each other.

The latch device for securing the two ends of the band 10 together may include a T-bolt or draw-bolt D having a threaded shank 24 and a T-shaped head H. The cross-head or T-shaped head H forms the trunnions 26 and 28 extending transversely of the shank which, as shown in Figs. 1 and 2, are seated within the loop 14 of the free end A of the band on either side of the slot 18, thus permitting the threaded shank 24 to extend outwardly through the slot 18 in a direction generally towards the other free end B of the band.

The head H of the draw-bolt D carries the sleeve bearings 30 and 32 to provide a greater bearing surface for rotation within the loop end 14 of the band. The bearings are in the form of cylindrical sleeves made of suitable bearing material. The bearings are made with a split portion or slot 34 thus enabling them to be made slightly oversize for easy installation on the draw-bolt. When the draw-bolt is tightened, the bearings contract thereby aligning themselves perfectly with the bolt cross-head H. The bearings 30 and 32 are also provided with projections or ears 36 and 38, which are adapted to engage the respective sides of the slot 18 (Fig. 1) and retain the bearings permanently in place after the clamp is assembled. Both the cross-head bolt and the bearings may be rotated through a substantial arc each independent of the other. Thus the T-bolt may be rotated in an arc commencing with its clamped position (Fig. 2) and ending when the bolt is rotated counterclockwise to the position where the bearing ears 36 contact the back end of the slot 18 (Fig. 1). The bearings may also rotate in substantially the same arc independent of the bolt. When the bolt is rotated counterclockwise, it may or may not carry the bearings back with it, depending on how the bearings were rotatively positioned initially on the bolt trunnions. When the bolt is positioned at the back end of the arc, the bolt shank engages the ears 36 and 38 which in turn engage the back end of slot 18. This construction eliminates the need for indenting the trunnions on the cross-head bolt and subsequently indenting the sleeve bearings to the trunnion indentations to retain the bearings on the trunnions after assembly. No secondary operation is required on the finished bearings as part of the assembly. This construction enables the complete bearing to be produced automatically at high speeds.

The latch device also includes a draw-bolt guide or T-shaped guide G having a shank 40 with a crosshead or T-head comprising the transversely extending trunnions 42 and 44 at one end thereof. The trunnions 42 and 44 are seated in the loop 16 at the free end B of the band, with the slotted shank 40 extending rearwardly through the longitudinal slot 20 (Fig. 1) and in the same general direction as the draw-bolt D so that it overlies a portion of the corresponding free end B of the band. The shank 40 is adapted to telescopically receive the draw-bolt shank 24 therein through the aperture 47.

The latch device also includes an interlock in the form of an abutment adjustably carried by the draw-bolt shank 24 for positioning against the outer extremity of the draw-bolt guide shank 40 to restrain relative axial movement of the bolt in the direction in which the free ends of the flexible band tend to separate. This adjustable abutment or the like may take the form of an internally threaded nut 46, which may be positioned against the outer extremity of the draw-bolt guide shank 40.

The draw-bolt guide G may be fabricated from a single piece of metal or the like and may be formed with a welded joint or seam 48 (Fig. 7) along each side of its shank 40. On clamps of large diameter, the shank of the draw-bolt guide G is lengthened, to position it sufficiently far from the band loop 16 to allow for the nut 46 and for wrench space to tighten the nut. Long shanks have been known to spread apart at the seam 48 if the seam is not welded or similarly closed, thus causing failures of the clamp when the seam is highly stressed. With the present construction, there is no loss of strength when the shank length is increased. In addition, a substantial reduction in weight of the draw-bolt guide G is effected.

The aforementioned construction enables facile assembly of the clamp. The split bearings are easily and quickly assembled onto the bolt trunnions after which the trunnions, with the bearings thereon, are placed in position on the band end A. Next, the loop is formed by turning back a portion of the end of band A and spot welding it to itself by the welds 12 as shown.

The terms and expressions which have been employed are used as terms of description and not of limitation and there is no intention in the use of such terms and expressions, of excluding any equivalents of the features shown or described or portions thereof, but it is recognized that various modifications are possible within the scope of the invention claimed.

I claim:

1. In a clamp comprising a flexible band having free ends adapted to embrace an object, each of said ends having a loop fixed thereto, each of said loops having a longitudinal outwardly facing slot through an upper portion thereof, a draw-bolt having a threaded shank and a T-shaped head forming trunnions, said bolt trunnions being disposed in one of said loops with the bolt shank extending through the associated slot in the loop thereby allowing said bolt to pivot on said band, a cylindrical lengthwise split sleeve-type bearing element mounted on each of said trunnions so as to be disposed between the respective trunnion and said one loop, said bearing elements being rotatable with respect to said one loop, each of said bearing elements at its inner terminal edge having an outwardly projecting lug thereon disposed in overlapping relatively movable relation with the associated edge of said slot in said one loop to prevent outward movement of said bearing element from its respective trunnion in a direction transverse of said band, said inner edge of each of said elements being engageable with said bolt shank to limit inward movement thereof in a direction transverse with respect to said band, a draw-bolt guide including a hollow shank open at both ends and having a T-shaped head forming trunnions at one end thereof, said last mentioned trunnions being received in the other of said loops with said guide shank extending through the associated slot in said other loop and in a direction for allowing the free extremity of the guide shank to overlie the exterior of said band, said guide shank being adapted to receive said draw-bolt shank therethrough when said band embraces an object, and means on said draw-bolt shank for a holding coaction with the threaded portion thereof and in abutting relation to said free extremity of said guide shank for adjustably locking said draw-bolt to said guide.

2. In a clamp in accordance with claim 1 wherein said draw-bolt guide is fabricated from flat metal stock whereby said guide shank portion initially has a lengthwise extending open seam in each side thereof, each of said seams being closed, as by welding the contiguous edges of the seam, to form said shank portion with a continuous cylindrical surface, to thereby provide a high-strength low cost guide irrespective of the magnitude of the guide shank's extension.

References Cited in the file of this patent

UNITED STATES PATENTS

| | | |
|---|---|---|
| 245,343 | Bradley | Aug. 9, 1881 |
| 2,395,745 | King | Feb. 26, 1946 |
| 2,724,885 | Zartler | Nov. 29, 1955 |
| 2,806,276 | Cooper | Sept. 17, 1957 |